United States Patent [19]

Neff

[11] Patent Number: 5,020,281

[45] Date of Patent: Jun. 4, 1991

[54] HIGH SPEED ROTARY HAND TOOL WITH ADJUSTABLE HEAD COUPLING

[75] Inventor: Edward R. Neff, Morris County, N.J.

[73] Assignee: American Pneumatic Technologies, Inc., O'Fallon, Mo.

[21] Appl. No.: 332,481

[22] Filed: Apr. 3, 1989

[51] Int. Cl.⁵ .............................................. B24B 23/02
[52] U.S. Cl. .................... 51/170 PT; 30/388
[58] Field of Search ...................... 51/170 R, 170 PT; 30/276, 390, 391, 388

[56] References Cited

U.S. PATENT DOCUMENTS

| | | | |
|---|---|---|---|
| H380 | 12/1987 | Yokocho | 30/276 |
| 2,390,226 | 12/1945 | Smith | 51/170 PT |
| 2,503,373 | 4/1950 | Browning et al. | |
| 3,691,788 | 9/1972 | Mazziotti | |
| 4,603,478 | 8/1986 | Anderson | 30/276 |
| 4,748,872 | 6/1988 | Brown | |
| 4,848,846 | 7/1989 | Yamada et al. | 30/276 |

Primary Examiner—Roscoe V. Parker
Attorney, Agent, or Firm—Kalish & Gilster

[57] ABSTRACT

A high speed rotary hand tool with an adjustable head coupling allows the tool head to be operated at extremely high speeds in a preselected angle in relation to the tool body. A coiled, flexible power drive is carried through a spherical head to transfer power from the motor drive to the tool drive. The spherical head has formed detent recesses in which detent balls are held by a combination of leaf springs and a locking sleeve. A safety pin and groove mechanism prevent the sleeve from being inadvertently released.

12 Claims, 2 Drawing Sheets

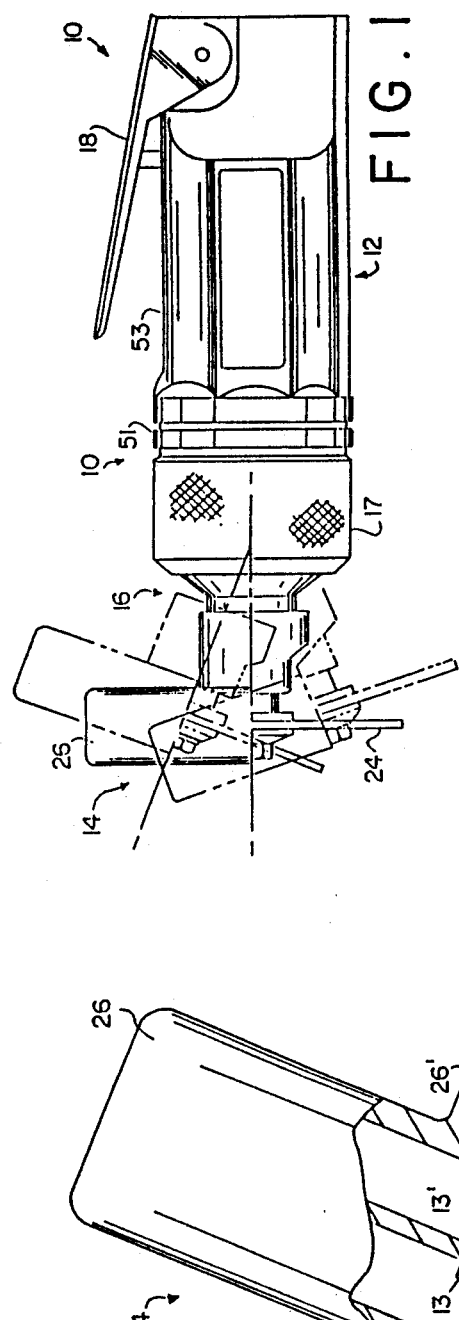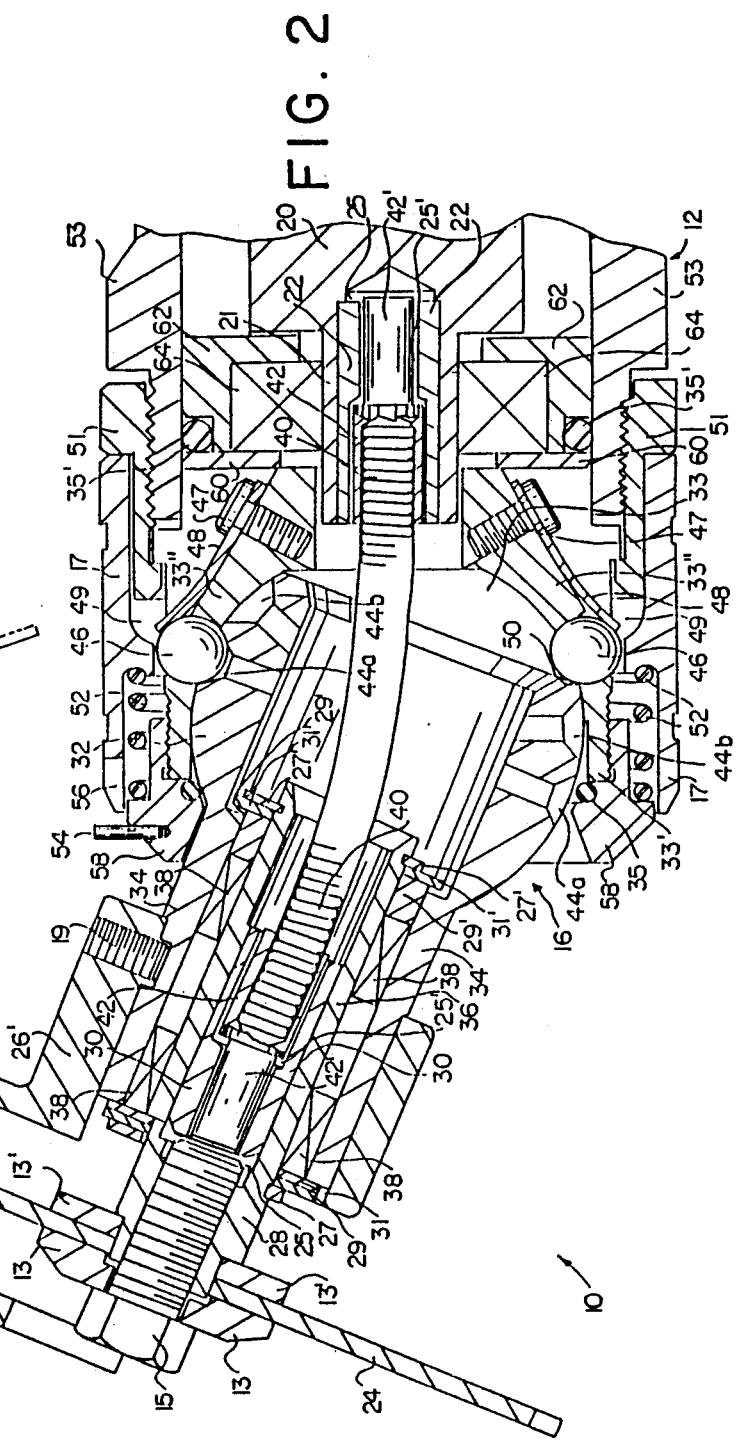

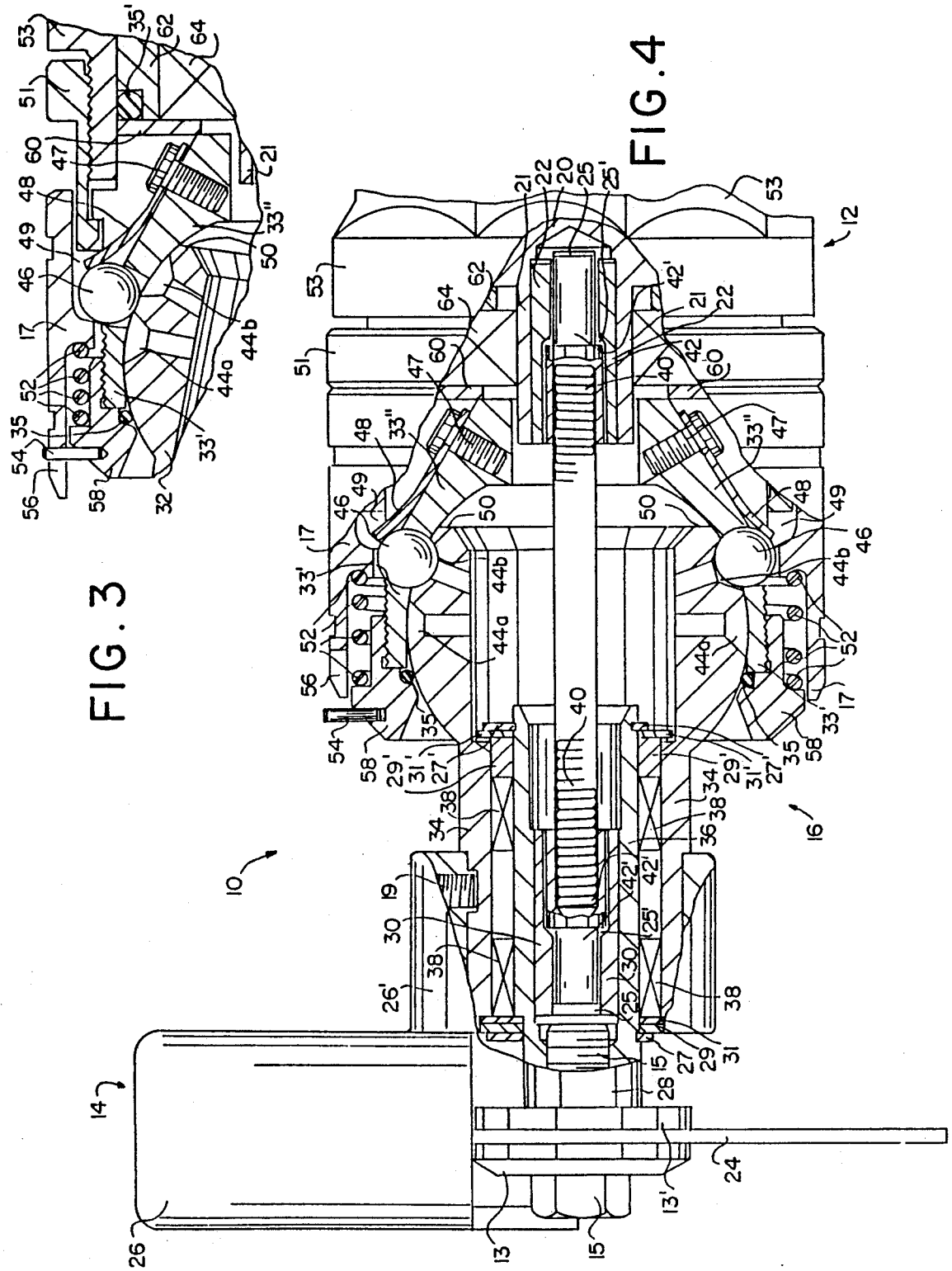

HIGH SPEED ROTARY HAND TOOL WITH ADJUSTABLE HEAD COUPLING

BACKGROUND AND SUMMARY OF THE INVENTION

The invention relates to hand tools of the type that are power driven, and, more particularly, to such a hand tool having a head that can be angled to allow better access to the work material.

Conventional power hand tools, such as drills, cutters and polishers, are limited in their usefulness due to the rigid axial alignment of the drive, power and tool shafts. Many work areas are inaccessible with these tools because the space is limited to less than the tool length, which cannot be shortened by adjusting the angle of the tool head.

Universal joints have proven unworkable for angled operation at speeds of up to 17,000 to 20,000 rpm, or more. Unless universal joints of constant velocity type are used, they produce unacceptably high angular acceleration of the divers components. Even so, under these high velocity conditions the joint components wear out rapidly, due to heat build-up from the friction of components. They also have objectionably high inertia and suffer from complicated construction.

Known flexible power drives are usable only at significantly lower speeds. At high speeds, due to excessive length, when angled, such flexible drives exhibit a whipping action or other distortion which effectively can cause the drive to fail prematurely or even self-destruct by wearing of the shaft against adjacent structures.

Accordingly, the several objects of the invention include provision of a power tool having a novel coupling assembly which connects the motor drive of a power tool to the tool head drive permitting selection of any of several positions of the tool head, either axially or non-axially; which coupling assembly is of constant velocity type; can be securely locked into the selected position for safety in operation; and which safely can be operated with free-wheeling, free-speeding operation to velocities of at least 17,000 to 20,000 rpm with low inertia and without substantial friction, heat build-up, and resultant rapid wear of the coupling or head components. Among other objects of the invention may be noted the provision of such a power tool which is extremely safe and highly reliable in use; which includes redundant securement of the head in a preselected position and which ensures against inadvertent change in head position.

Briefly, a high speed rotary tool apparatus of the hand-held type comprises a body, a tool head, and swivel means adjustably connecting the tool head to the body in preselected angular orientation; the body, including a motor and a high speed rotary drive shaft; the tool head having a tool shaft for carrying a tool to be rotationally driven by the motor at high speed; the swivel means having a power shaft for coupling power from the motor drive shaft to the tool shaft; the power shaft being a single flexible shaft which is flexibly bent when the tool head is at a non-axial angular orientation to the body; and means for guiding and restraining at least one end of the power shaft when bent to prevent whipping or oscillation of the power shaft when rotating.

Other objects and features will be in part apparent and in part pointed out hereinbelow.

The apparatus of the present invention further accomplishes the above-mentioned objects as follows: A flexible wound power shaft is used with crimped sleeves at each end which each fit into a square (or other polygonally shaped) drive. The square drive ends of the power drive in turn are fitted into the female square (or other correspondingly polygonally shaped) drive bushings of the motor drive and the tool head drive, to avoid the whipping action seen at high speeds with conventional flexible drives. A greater path length is provided from the motor drive shaft to the tool shaft than the overall length of the power drive providing gap spacing which accommodates the excess length of the power shaft which results when bent along an angled path. The swivel means provides a coupling assembly having a substantially spherical coupling to allow the tool head to be positioned at one of a plurality of angles or axially in relation to the tool body. Detent mechanisms comprising a plurality of detent balls and recesses allow the coupling assembly to be stablized in a preselected position. Leaf springs resiliently urge the detent balls into their recesses and a spring-loaded locking sleeve forms the outermost tool surface around the coupling mechanism and prevents the detent balls from slipping out of their positions during tool operation, and until a new head position is selected. A safety locking pin and corresponding groove located on the shoulder or forward portion of the spring-loaded locking sleeve prevent the sleeve from inadvertently being axially shifted from its locked position unless the safety pin and groove are in alignment, as accomplished by selectively rotating the sleeve.

BRIEF DESCRIPTION OF THE DRAWINGS

FIG. 1 is a side elevation of a high speed rotary hand tool with adjustable head coupling in accordance with the invention, with the tool head shown axially aligned and in phantom at upward and downward angles.

FIG. 2 is an enlarged fragmentary cross section of the tool with the head in an upward angled position.

FIG. 3 is a fragmentary cross section of the sleeve locking mechanism in its released position and a detent ball between recesses.

FIG. 4 is a fragmentary cross section of the tool with the head axially aligned.

DESCRIPTION OF THE PREFERRED EMBODIMENT

Referring to the drawings, illustrated generally at 10 is a high speed rotary hand tool apparatus with an adjustable head coupling (or swivel means) generally designated 16 which embodies the preferred form of the present invention. The apparatus 10 is generally comprised of a tool body generally designated 12, a tool head generally designated 14 and swivel means 16 which permit the head 14 to be positioned axially or non-axially in relation to the body 12 (FIG. 1).

The body 12 carries a locking sleeve 17 and a conventional power control handle 18 and houses a preferably pneumatic motor device (not shown) although other motors may be used. The body 12 also carries a high speed rotary drive shaft 20, having a preferably square, female drive bushing 22 (FIGS. 2 and 4).

The tool head 14 is partially covered by a conventional protective shield 26, having a neck 26' attached by a machine screw 19 to the spindle housing portion 34 of the swivel means 16. The active tool member 24, such as a cutter or grinder, and its sandwiching washers 13, 13' are machine bolted 15 to the tool shaft 28 which in turn carries a preferably square female drive bushing 30 within the tool shaft spindle portion 36 (FIGS. 2 and 4).

The tool shaft 28 is encircled above its spindle portion 36 by a retaining ring 27, a thrust washer 29 and a dust shield 31, which act to retain and protect needle roller bearings 38.

The swivel means 16 preferably consists of a substantially spherical head 32, which is received by a socket 33 (formed by socket forming members 33', 33", topped by an O-ring 35 in the apparatus body 12) and is attached to a spindle housing portion 34 which houses the tool shaft 28 spindle portion 36 preferably mounted on needle roller bearings 38 therein. Directly beneath the needle roller bearings 38 are located a thrust bearing 29', a dust shield 31' and a retaining ring 27'.

The power drive 40 comprises a coiled, flexible shaft, at each end of which is crimped a power shaft end or sleeve 42, terminating in a preferably square drive end 42', which is fitted into the preferably square female drive bushings 22, 30 of the motor drive shaft 20 and the tool shaft 28. The shape of the drive ends 42' and corresponding bushings 22, 30 may be of other polygonal form if angled to prevent slippage.

Substantial gaps 25, 25' exist between the front edge and rear shoulder of the square drive ends 42' of the power drive 40 and their respective bushings 22, 30. The gaps 25, 25' are necessary to accommodate the excess length of the power shaft 40 when bent along a non-axial path (FIG. 2) and are shown exaggerated in FIG. 4 for clarity.

The spherical head 32 of the swivel means 16 is formed with preferably four detent recesses 44, one pair 44a, 44b of conically shaped recesses located 180° apart, at approximately the mid-section of the spherical head 32, and the second pair 44b of either conical or V-shaped cross-section arranged just posterior to the first. Although said second pair 44b of detent recesses may be separately formed, it may be more conveniently formed by diametrially opposed portions of a single annular groove (not shown) machined into the surface of head 32 commensurate with the cross-section of recesses 44b. The flattened shoulder 50 of the spherical head 32 also acts very advantageously as a detent. Two detent balls 46 are resiliently urged by leaf springs 48 into the detent recesses 44, or alternatively, one may be held against the shoulder 50. This detent 44, 50 and ball 46 arrangement permits the tool head 14 to be positioned in relation to the tool body 12 either axially (FIGS. 1 and 4) or 22.5° above (FIG. 2) or below the axis. The leaf springs 48 are secured by machine bolts 47 to the socket forming members 33" of the apparatus body 12 and extend into an enlargeable space 49 formed by the locking sleeve 17.

The locking sleeve 17, positioned outward of the detent balls 46, is held in place by a coiled compression spring 52. In the forward shoulder 58 of the tool apparatus body 12 is a safety pin 54 which fits into a groove 56 in the locking sleeve 17. The shoulder 58 carries internal threads which engage the external threads of socket forming member 33'. Sleeve 17 can be rotated a few degrees to a "safe" position so that pin 54 and groove 56 are not in alignment, whereby the locking sleeve 17 is prevented from being inadvertently shifted. Such shifting could allow the detent balls 46 to slip from their respective detents 44, 50 (illustrated in FIG. 3) into the gap 49, followed by the tool head 14 changing position during operation, with potentially disastrous results. The locking sleeve 17 abuts the shoulder of an internally threaded ring 51 which screws into an externally threaded handpiece 53 of the apparatus 10. Inward of the externally threaded handpiece 53 are located an apparatus body dust shield 60 and an O-ring seal 35'. A bearing retention sleeve 62 defines the seats of the O-ring 35' and a bearing 64, in which the neck 21 of the high speed motor drive shaft 20 is journaled.

It is apparent that tool 10 offers significant advantages over conventional axially aligned automatic hand tools. Adjustability of the tool head 14 in relation to the body 12 provides increased access to the work material and other features permit extended safe and reliable operation. More specifically, the flexible, coiled power drive 40, combined with the spherical head 32 of the swivel means 16, permits adjustment of the tool head 14 to preferably 22.5° above or below the axis, and potentially to many other positions as well. The needle roller bearings 38 provide extremely low friction operation and thus reduced heat build-up and wear of the motor, tool and power drive components (FIGS. 2 and 4). Furthermore, the square power drive ends 42', attache by relatively long crimped sleeves 42 to the power drive 40, prevent the whipping action and resultant destruction of coupling components experienced with conventional flexible power drives.

Additional positive features of the invention include the gaps 25, 25' maintained beyond the square power drive ends 42' to prevent the problem of lost motion or run-out due to excess length of the power drive 40 during tool 10 operation. Runout occurs when the tool head 14 is not axially aligned with the body 12, creating an angled path for the power drive 40. The combined features of the detent mechanism 44, 46, 50, locking sleeve 17 and safety pin 54 permit the preselected angle of operation to be securely maintained.

Although the adjustable head coupling 10 is shown for use with high speed rotary hand tools, its many advantages may be envisioned to apply to other non-rotary automatic hand tools, such as hammers or staplers, as well.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A high speed rotary tool apparatus of the hand-held type comprising a body, a tool head, and swivel means adjustably connecting the tool head to the body in preselected angular orientation; the body including a motor and a high speed rotary drive shaft; the tool head having a tool shaft for carrying a tool to be rotationally driven by the motor at high speed; the swivel means having a power shaft for coupling power from the motor drive shaft to the tool shaft; the power shaft being a single flexible shaft which is flexibly bent when the tool head is at a non-axial angular orientation to the body; and means for restraining at least one end of the power shaft when bent to prevent whipping or oscillation of the power shaft when rotating, said swivel means comprising a spherical head and a socket for receiving the head, and selectively engageable redundant detent means for interengaging the spherical head and socket to maintain a preselected one of a plurality of possible angular orientations.

2. A high speed rotary tool apparatus of the hand-held type comprising a body, a tool head, and swivel means adjustably connecting the tool head to the body in preselected angular orientation; the body including a motor and a high speed rotary drive shaft; the tool head having a tool shaft for carrying a tool to be rotationally driven by the motor at high speed; the swivel means having a power shaft for coupling power from the motor drive shaft to the tool shaft; the power shaft being a single flexible shaft which is flexibly bent when the tool head is at a non-axial angular orientation to the body; and means for restraining at least one end of the power shaft when bent to prevent whipping or oscillation of the power shaft when rotating, safety locking means, including a locking sleeve, selectively axially shiftable for permitting change in the angular orientation of said swivel means and having a groove in its forward end; and a safety pin, the pin securing, when not aligned with the groove, the sleeve against axial shifting for preventing inadvertent change in the angular orientation of the swivel means.

3. A high speed rotary tool apparatus of the hand-held type comprising a body including a motor and a high speed rotary drive shaft, a tool head, and swivel means adjustably connecting the tool head to the body in preselected angular orientation, the tool head having a tool shaft for carrying a tool to be rotationally driven by the motor at high speed; the swivel means having a power shaft for coupling power from the motor drive shaft to the tool shaft; the power shaft being a single flexible shaft which is flexibly bent when the tool head is at a non-axial angular orientation to the body, said non-axial angular orientation causing shortening of the path length between the motor drive shaft and tool shaft; and means for accommodating the excess length of the power shaft when bent along the angled path, said swivel means comprising a substantially spherical head and socket for receiving the head, and selectively engageable redundant detent means for interengaging the spherical head and socket to maintain a preselected one of a plurality of possible angular orientations.

4. A high speed rotary tool apparatus of the hand-held type comprising a body including a motor and a high speed rotary drive shaft, a tool head, and swivel means adjustably connecting the tool head to the body in preselected angular orientation, the tool head having a tool shaft for carrying a tool to be rotationally driven by the motor at high speed; the swivel means having a power shaft for coupling power from the motor drive shaft to the tool shaft; the power shaft being a single flexible shaft which is flexibly bent when the tool head is at a non-axial angular orientation to the body, said non-axial angular orientation causing shortening of the path length between the motor drive shaft and tool shaft; and means for accommodating the excess length of the power shaft when bent along the angled path, safety locking means, including a locking sleeve selectively axially shiftable for permitting change in the angular orientation of said swivel means and having a groove in its forward end; and a safety pin, the pin securing, when not aligned with the groove, the sleeve against axial shifting for preventing inadvertent change in the angular orientation of the swivel means.

5. A high speed rotary tool apparatus of the hand-held type comprising a body including a motor and a high speed rotary drive shaft, a tool head, and swivel means adjustably connecting the tool head to the body in preselected angular orientation; the tool head having a tool shaft for carrying a tool to be rotationally driven by the motor at high speed; the swivel means having a power shaft for coupling power from the motor drive shaft to the tool shaft and comprising a substantially spherical head and a socket for receiving the head, and selectively engageable redundant detent means for interengaging the spherical head and socket to maintain a preselected one of a plurality of possible angular orientations.

6. A high speed rotary tool apparatus according to claim 5, and further characterized by safety locking means, including a locking sleeve axially selectively shiftable for permitting change in the angular orientation of said swivel means, and having a groove in its forward end; and a safety pin, the pin securing, when not aligned with the groove, the sleeve against axial shifting for preventing inadvertent change in the angular orientation of the swivel means.

7. A high speed rotary tool apparatus according to claim 5 and further characterized by one of a plurality of detent means comprising an annular groove circumscribing a segment of the substantially spherical head.

8. A high speed rotary tool apparatus according to claim 5 and further characterized by one of a plurality of detent means comprising the shoulder-like surface of the substantially spherical head.

9. A high speed rotary tool apparatus according to claim 5 and further characterized by said detent means being comprised of a plurality of detent recesses into which detent balls are resiliently urged by leaf springs.

10. A high speed rotary tool apparatus of the hand-held type comprising a body, a tool head, and swivel means adjustably connecting the tool head to the body in preselected angular orientation; the body, including a motor and a high speed rotary drive shaft; the tool head having a tool shaft for carrying a tool to be rotationally driven by the motor at high speed; the swivel means having a power shaft for coupling power from the motor drive shaft to the tool shaft; the power shaft being a single flexible shaft which is flexibly bent when the tool head is at a non-axial angular orientation to the body; and means for restraining at least one end of the power shaft when bent to prevent whipping or oscillation of the power shaft when rotating; the non-axial tool head orientation to the body causing shortening of the path length between the drive shaft and tool shaft; and means for accommodating the excess length of the power shaft when bent along the angled path; the swivel means comprising a substantially spherical head and a socket for receiving said head, and selectively engageable redundant detent means for interengaging the spherical head and socket to maintain a preselected one of a plurality of possible angular orientations.

11. A high-speed tool apparatus of the hand-held type comprising a body, a tool head, and swivel means adjustably connecting the tool head to the body in preselected angular orientation; the body including a motor and a high speed drive shaft; the tool head having a tool shaft for carrying a tool to be driven by the motor at high speed; the swivel means housing a power shaft for coupling power from the motor drive shaft to the tool shaft; the power shaft being a single flexible shaft which is flexibly bent when the tool head is at a non-axial angular orientation to the body, the non-axial angular orientation causing shortening of the path length between the drive shaft and tool shaft, means for accommodating the excess length of the power shaft when bent along the angled path; the swivel means comprising a spherical head and a socket for receiving said head, and selectively engageable redundant detent means for interengaging the spherical head and socket to maintain a preselected one of a plurality of possible angular orientations.

12. A high speed rotary tool apparatus of the hand-held type comprising a body, a tool head, and swivel means adjustably connecting the tool head to the body in preselected angular orientation, the body including a motor and a high speed rotary drive shaft, the tool head having a tool shaft for carrying a tool to be rotationally driven by the motor at high speed, the swivel means having a power shaft for coupling power from the motor drive shaft to the tool shaft; the power shaft being a single flexible shaft enclosed by the body and the tool head, which shaft is flexibly bent when the tool head is at a non-axial angular orientation to the body, the non-axial angular orientation causing shortening of the path length between the drive shaft and the tool shaft whereby the power shaft has an effective excess length when flexibly bent, and means for restraining at least one end of the power shaft when bent to prevent whipping or oscillation of the power shaft when rotating, further characterized by polygonal drive ends at each end of the power shaft for coupling the power shaft to corresponding bushings of the motor drive shaft and the tool shaft, there being gaps between said bushings and a front end and a rear shoulder of the respective drive end for accommodating said excess length of the power shaft when so flexibly bent.

* * * * *